US011894769B2

United States Patent
Langeslag et al.

(10) Patent No.: US 11,894,769 B2
(45) Date of Patent: Feb. 6, 2024

(54) PHASE CONTROL OF INTERLEAVED BOOST CONVERTER USING CYCLE RING TIME

(71) Applicant: NXP USA, Inc., Austin, TX (US)

(72) Inventors: Wilhelmus Hinderikus Maria Langeslag, Wijchen (NL); Remco Twelkemeijer, Wijchen (NL)

(73) Assignee: NXP USA, Inc., Austin, TX (US)

( * ) Notice: Subject to any disclaimer, the term of this patent is extended or adjusted under 35 U.S.C. 154(b) by 352 days.

(21) Appl. No.: 17/364,756

(22) Filed: Jun. 30, 2021

(65) Prior Publication Data

US 2023/0006551 A1   Jan. 5, 2023

(51) Int. Cl.
*H02M 3/155* (2006.01)
*H02M 1/42* (2007.01)
*H02M 1/00* (2006.01)
*H02M 3/158* (2006.01)

(52) U.S. Cl.
CPC ......... *H02M 3/155* (2013.01); *H02M 1/0058* (2021.05); *H02M 1/42* (2013.01); *H02M 1/4225* (2013.01); *H02M 3/1584* (2013.01); *H02M 3/1586* (2021.05)

(58) Field of Classification Search
CPC .. H02M 3/155; H02M 3/1584; H02M 3/1586; H02M 1/0058; H02M 1/42; H02M 1/4225; H02M 1/14; H02M 1/44; Y02B 70/10
See application file for complete search history.

(56) References Cited

U.S. PATENT DOCUMENTS

| | | | |
|---|---|---|---|
| 11,444,540 B1 * | 9/2022 | Langeslag | H02M 1/4225 |
| 11,557,960 B1 * | 1/2023 | Twelkemeijer | H02M 1/4225 |
| 2007/0253223 A1 | 11/2007 | Neidorff et al. | |
| 2012/0218792 A1 | 8/2012 | Ziegler et al. | |
| 2014/0152271 A1 | 6/2014 | Jeong et al. | |

(Continued)

FOREIGN PATENT DOCUMENTS

CN   101753014 B *  1/2012
WO   WO-2020205167 A1   10/2020

OTHER PUBLICATIONS

Choi, Woo-Young et al.; "An Efficient Power-Factor Correction Scheme for Plasma Display Panels"; Journal of Display Technology; vol. 4, No. 1; Mar. 2008; pp. 70-80.

(Continued)

*Primary Examiner* — Kyle J Moody
*Assistant Examiner* — Jye-June Lee

(57) ABSTRACT

A method and apparatus are described for controlling the phase of an interleaved boost converter using cycle ring time. In an embodiment, a cycle controller generates a first drive signal to control switching of a first converter and a second drive signal to control switching of a second converter, the controller receives a first cycle signal from the first converter and a second cycle signal from the second converter, wherein the first cycle signal and the second cycle signal have a power phase time and a ringing phase time. The cycle controller determines a master ringing phase time of the first cycle signal and applies the master ringing phase time to the second cycle signal to determine a slave ringing phase time. The cycle controller generates the second drive signal in accordance with the slave ringing phase time.

20 Claims, 11 Drawing Sheets

(56) References Cited

U.S. PATENT DOCUMENTS

| | | |
|---|---|---|
| 2015/0146467 A1 | 5/2015 | Seong et al. |
| 2016/0276924 A1 | 9/2016 | Castelli |
| 2022/0103078 A1 | 3/2022 | Fan et al. |
| 2022/0158545 A1 | 5/2022 | Tan |
| 2023/0069460 A1* | 3/2023 | Langeslag .............. H02M 1/14 |

OTHER PUBLICATIONS

Liu, Zhengyang et al.; "Design and Evaluation of GaN-Based Dual-Phase Interleaved MHz Critical Mode PFC Converter"; 2014 IEEE Energy Conversion Congress and Exposition; Nov. 2014; pp. 611-616.
Adragna, C. et al.; "Analysis and Performance Evaluation of Interleaved DCM/CCM Boundary Boost PFC Converters Around Zero-Crossing of Line Voltage"; Applied Power Electronics Conference and Exposition; APEC 2009; Twenty-Fourth Annual IEEE, Piscataway, NJ, USA; Feb. 15, 2009; pp. 1151-1157.
U.S. Appl. No. 17/412,223, filed Aug. 25, 2021 (46 pages).
Balestero, Juan Paulo Robles et al. "Power Factor Correction Boost Converter Based on the Three-State Switching Cell", IEEE Transactions on Industrial Electronics, vol. 59, No. 3, Mar. 2012, 13 pgs.
Bento, Aluisio A. M. et al. "Reducing Inductor Size and Current Ripple in an AC-AC Converter by Interleaved Switching Strategy", Downloaded on Apr. 24, 2021 from IEEE Xplore, (2006), 7 pgs.
Cao, Guoen et al. "A Novel Critical-Conduction-Mode Bridgeless Interleaved Boost PFC Rectifier", The 2014 International Power Electronics Conference, (2014), 6 pgs.
Tomioka, Satoshi et al. "Interleaved-Boost-Input Type Isolated Full Bridge PFC Converter", IEEE PEDS 2005, Downloaded on Apr. 24, 2021 from IEEE Xplore, 6 pgs.
U.S. Appl. No. 17/412,223 NFOA, filed Mar. 9, 2023 (37 pages).
Huber, Laszlo et al.; "Closed-Loop Control Methods for Interleaved DCM/CCM Boundary Boost PFC Converters"; 2009 Twenty-Fourth Annual IEEE Applied Power Electronics Conference and Exposition; Feb. 2009; pp. 991-997.
Park, Moo-Hyun et al. "ZVS Interleaved Totem-pole Bridgeless PFC Converter with Phase-shifting Control", The 2018 International Power Electronics Conference, (2018), 5 pgs.
Aditya, Kunwar et al. "Design of 3.3 kW Wireless Battery Charger for Electric Vehicle Application Considering Bifurcation", 2017 IEEE Electrical Power and Energy Conference (EPEC), (2017), 6 pgs.
Chang, Chien-Hsuan et al. "An Interleaved Single-Stage LLC Resonant Converter Used for Multi-Channel LED Driving", The 2014 International Power Electronics Conference, (2014), 8 pgs.
U.S. Appl. No. 17/412,223 Notice Of Allowance dated Aug. 25, 2023 (9 pages).

* cited by examiner

PHASE CONTROL OF INTERLEAVED BOOST CONVERTER USING CYCLE RING TIME

BACKGROUND

Electric power conversion is widely used in varied applications including adjustable-speed electric motor drives, switch-mode power supplies, uninterrupted power supplies (UPSs), and battery energy storage. In high-power applications, two boost converters are often interleaved to improve the performance and reduce the size of converter. For high-current applications and voltage step-up, the currents through the solid-state switches are just fractions of the input current. Interleaving also doubles the effective switching frequency and allows the size of energy-storage inductors and EMI filter components to be reduced. This also reduces input and output ripples in the current. The switches are used to time the power phase of each converter. Typically, the two converters alternate in operation so that their power cycles are 180 degrees out of phase.

Power Factor Correction (PFC) converters are used for improved power quality and improved efficiency. Passive PFC may be performed using tuned LC filters, but these may have a limited frequency and power range. Active PFC uses actively controlled solid-state switches in association with passive elements. The switches allow the PFC converter to operate in different modes. A PFC boost converter boosts the input voltage for a higher output voltage.

SUMMARY

A method and apparatus are described for controlling the phase of an interleaved boost converter using cycle ring time. In an embodiment, an interleaved boost converter includes a first converter operating as a master converter to receive an input power and generate a first converted output power, a second converter operating as a slave converter to receive the input power and generate a second converted output power, wherein the first converted output power and the second converted output power are interleaved, a cycle controller to generate a first drive signal to control switching of the first converter and a second drive signal to control switching of the second converter, to receive a first cycle signal from the first converter and a second cycle signal from the second converter, wherein the first cycle signal and the second cycle signal have a power phase time corresponding to a power phase of the respective converter and a ringing phase time corresponding to a ringing phase of the respective converter, the cycle controller to determine a master ringing phase time of the first cycle signal and to apply the master ringing phase time to the second cycle signal to determine a slave ringing phase time, the cycle controller generating the second drive signal in accordance with the slave ringing phase time.

In an embodiment, the master ringing phase time comprises a number of valleys of the first cycle signal during the first cycle signal ringing phase and wherein the cycle controller determines the slave ringing phase time by counting a same number of valleys of the ringing phase of the second cycle signal so that the second drive signal is generated after the same number of valleys.

In an embodiment, the master ringing phase time comprises a master time duration corresponding to a number of valleys of the ringing phase of the first cycle signal, wherein the cycle controller applies the master time duration to the ringing phase of the second cycle signal and determines the slave ringing phase time as ending at a valley of the ringing phase of the first cycle signal that is closest to an end of the master time duration.

In an embodiment, the cycle controller determines the slave ringing phase time by determining a slave oscillation time of the ringing phase of the second cycle signal, selecting a valley before the end of the master time duration applied to the ringing phase of the second cycle signal, determining a distance between the selected valley and the end of the master time duration applied to the ringing phase of the second cycle signal, if the distance is less than one half of the oscillation time, then determining that the selected valley is the closest, and if the distance is more than one half of the oscillation time, then determining that a subsequent valley is the closest.

In an embodiment, the master time duration begins at a first local minimum of the first cycle signal and ends after the number of valleys, the valleys being local minima of the ringing phase of the first cycle signal.

In an embodiment, the closest valley is determined by selecting a local minimum of the second cycle signal that is closest to the master time duration.

In an embodiment, receiving a first cycle signal comprises receiving a first voltage from auxiliary windings of a first inductor of the first converter and wherein receiving a second cycle signal comprises receiving a second voltage from auxiliary windings of a second inductor of the second converter.

In an embodiment, determining a master ringing phase time comprises detecting voltage zero crossings of the first voltage.

In an embodiment, receiving a first cycle signal comprises receiving a first voltage from a drain of a first transistor of the first converter and wherein receiving a second cycle signal comprises receiving a second voltage from a drain of a second transistor of the second converter.

In an embodiment, determining a master ringing phase time comprises determining when the first voltage is less than an input voltage to the first converter.

In an embodiment, the cycle controller is further to store the master ringing phase time and to apply the stored master ringing phase time to determine a subsequent slave ringing phase time.

An embodiment further includes a differential ON time generation circuit to generate a first ON time for the first converter and a second ON time for the second converter using an ON time input, the first and the second ON time determining a duration during which the first and the second converters are switched on, and wherein the cycle controller is configured to receive the first ON time and the second ON time and to generate the first drive signal and the second drive signal using the first ON signal and the second ON signal, respectively.

An embodiment further includes a phase detector to receive a first phase feedback signal of the first converter and a second phase feedback signal of the second converter to measure a phase difference between the first and the second phase feedback signal and to produce a phase detection output indicating the measurement, a phase controller coupled to the phase detector to receive the phase detection output and to generate a phase adjustment output in response to the phase detection output, wherein the differential ON time generation circuit is coupled to the phase controller to receive the phase adjustment output and to generate the first and the second ON time in response thereto to adjust the phase between the first and the second phase feedback signals toward 180 degrees.

In an embodiment, the master ringing phase time comprises a time between an end of the power phase time and a start of a next power phase time when the first converter is operating in a Discontinuous Conduction Mode (DCM).

In an embodiment, the first converter and the second converter are power factor correction (PFC) converters and the input power has an alternating current.

In an embodiment, a method is disclosed which includes receiving an input power at a first converter and at a second converter, generating an output power as an interleaved output of the first converter and the second converter, generating a first drive signal to control switching of the first converter, receiving a first cycle signal from the first converter; receiving a second cycle signal from the second converter, wherein the first and the second cycle signals have a power phase time corresponding to a power phase of the respective converter and a ringing phase time corresponding to a ringing phase of the respective converter, determining a master ringing phase time of the first cycle signal, applying the master ringing phase time to the second cycle signal to determine a slave ringing phase time, and generating a second drive signal to control switching of the second converter in accordance with the slave ringing phase time.

In an embodiment, the master ringing phase time comprises a master time duration corresponding to a number of valleys of the ringing phase of the first cycle signal, the method further includes applying the master time duration to the ringing phase of the second cycle signal, and determining the slave ringing phase time as ending at a valley of the ringing phase of the first cycle signal that is closest to an end of the master time duration.

In an embodiment, the master time duration begins at a first local minimum of the first cycle signal and ends after the number of valleys, the valleys being local minima of the ringing phase of the first cycle signal and wherein determining the closest valley comprises selecting a local minimum of the second cycle that is closest to the master time duration.

In an embodiment, an interleaved boost converter controller is disclosed. The controller includes an output to provide a first drive signal to control the switching of a first converter, the first converter to receive an input power and generate a first converted output power, an output to provide a second drive signal to control the switching of a second converter, the second converter to receive the input power and generate a second interleaved output power, an input to receive a first cycle signal from the first converter, an input to receive a second cycle signal from the second converter, wherein the first and the second cycle signals have a power phase time corresponding to a power phase of the respective converter and a ringing phase time corresponding to a ringing phase of the respective converter, and control means within the controller to determine a master ringing phase time of the first cycle signal and to apply the master ringing phase time to the second cycle signal to determine a slave ringing phase time, the controller generating the second drive signal in accordance with the slave ringing phase time.

In an embodiment, the master ringing phase time comprises a master time duration corresponding to a number of valleys of the ringing phase of the first cycle signal, wherein the cycle controller applies the master time duration to the ringing phase of the second cycle signal and determines the slave ringing phase time as ending at a valley of the ringing phase of the first cycle signal that is closest to an end of the master time duration.

DETAILED DESCRIPTION

Figure 1:
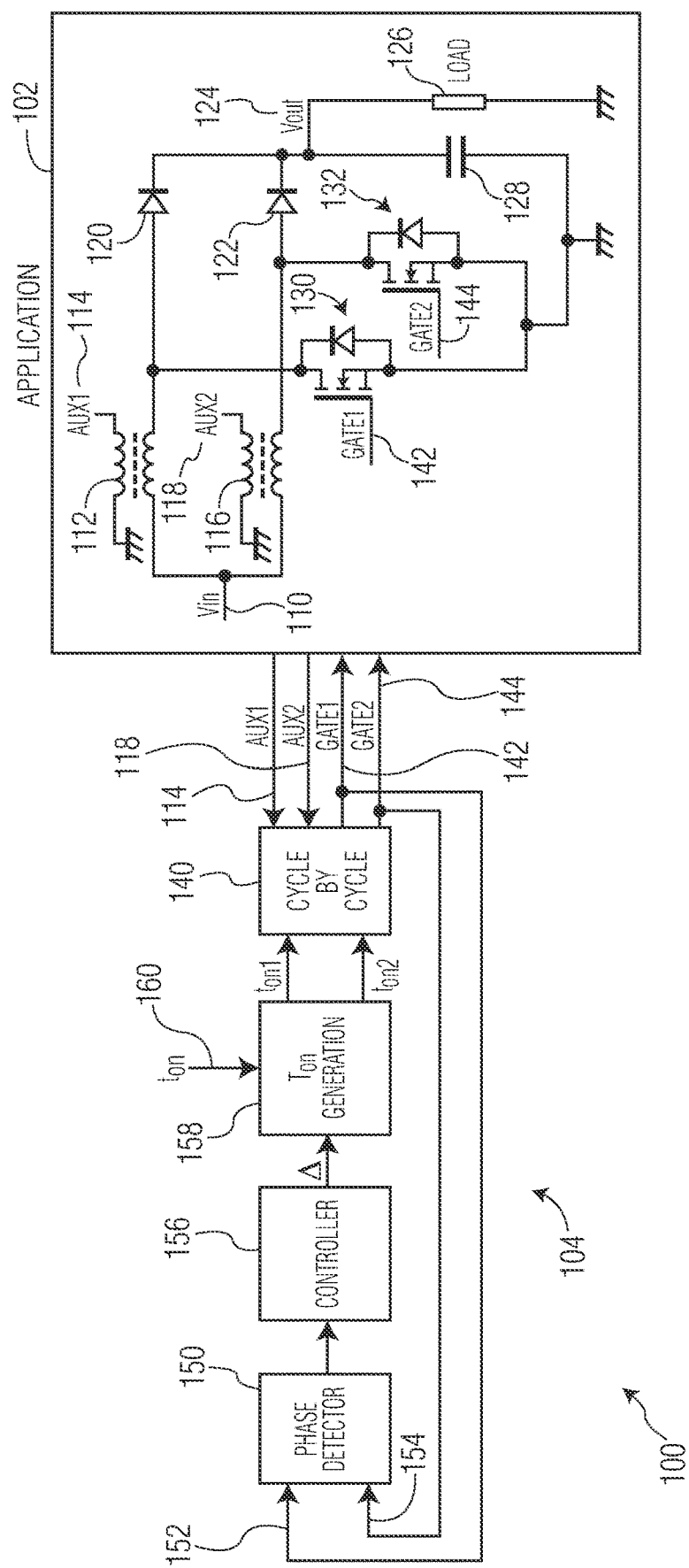
FIG. 1 is a diagram of a DC-DC interleaved boost converter.

It will be readily understood that the components of the embodiments as generally described herein and illustrated in the appended FIGS. could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

An interleaved PFC boost converter has two discrete converters that can be controlled independently. The two converters are switched on and off independently so that the on time of each converter is regulated separately. By controlling the on times, the phase between the two converters can be maintained close to 180 degrees so that the power output is interleaved. As described herein, the on time has two dimensions. The first is the duration that a converter is drawing power from the input. In a simple single MOSFET (Metal Oxide Semiconductor Field Effect Transistor) switch converter circuit, this on time is the time during which the switch is on. The second dimension is the time at which the gate is switched on. This is directly related to the phase or period of the converter switch.

FIG. 1 is a diagram of a DC-DC (Direct Current to Direct Current) interleaved boost converter 100 with an application 102 and a control system 104. The application 102 receives a DC input voltage 110 which is divided into two interleaved converters. The first converter receives the DC input voltage 110 at a first inductor 112 in series with a first diode 120 coupled to the converter voltage output 124. A drain of a switch 130 in the form of a MOSFET (Metal Oxide Semiconductor Field Effect Transistor) is coupled between the first inductor 112 and the first diode 120. While a MOSFET is shown, other transistor types, such as bipolar transistors and other materials may be used such as GaN or SiC, among others, to suit different loads and input voltages. The source of the switch is coupled to ground. The second converter receives the DC input voltage 110 at a second inductor 116 in series with the DC input voltage 110 on one side of the inductor and in series with a second diode 122 on the other side of the inductor. The output nodes of the two diodes are coupled together at the converter output 124 opposite the inductors 112, 116. A drain of a second switch 132 in the form of a second MOSFET is coupled between the second inductor 116 and the second diode 122. The source of the first switch 130 and of the second switch 132 are both coupled to ground. The second converter has the same converter output 124 coupled to the outputs of the two diodes 120, 122. The output has a filter 128 in the form of parallel capacitor but a more complex filter may be used to suit different loads and input voltages. A load 126 is coupled to the converter output 124 and shown here as within the application. The load may be any type of energy storage or energy consumption device.

While the gate of a converter is ON, a power phase starts with a primary stroke as power is drawn from the input and stored in the inductor. Then during a secondary stroke of the power phase power is drawn from the input and delivered to the output. Also, the energy stored in the inductor is delivered to the output. When the current becomes zero, a ringing phase starts.

The two switches 130, 132 are controlled by cycle-by-cycle controller 140 that generates respective first and second drive signals 142, 144. The cycle-by-cycle controller 140, also referred to as the cycle controller, adjusts the first and second drive signals 142, 144 such that phase can be adjusted and the total power is regulated. The current through the respective two diodes 120, 122 therefore is interleaved and shifted in time.

A 180 degree phase difference means that the second converter turns on at a time that is exactly half-way between two turn on times of the first converter. Under some circumstances, the power from the two converters to the output alternates. At low input voltages each converter may be turned on for more than half of its cycle. As a result, the power phases of the converters overlap. At high input voltage the diode conducting time may be more than half of the converter's cycle. In this case both diodes are conducting at the same time, although one of the diodes may be at a higher current because of the phase difference of the converters.

A differential ON time generation circuit 158 receives an ON time input 160 from an external controller (not shown) and a phase difference signal from a phase controller 156. This information is used to generate a respective first ON time and a second ON time that is provided to the cycle-by-cycle controller to control the duration during which the first and the second converters are switched ON. The differential ON time generation circuit receives the phase adjustment output and generates the first and the second ON time in response to adjust the phase between the first and the second phase feedback signals toward 180 degrees. In some embodiments the ON time input 160 is a current or a voltage. The current or voltage may be increased for a longer ON time or reduced for a shorter ON time. The ON time may be a numerical value that represents a number of milliseconds or microseconds. In some embodiments, the phase difference is a numerical value which represents the difference in phase between the first and the second converter in milliseconds or microseconds.

The differential ON time generation circuit may generate the first ON time using the phase differential because increasing the ON time of one converter compared to the other converter will change the relative phase between the converters. In some embodiments $$t_{ON}1 = t_{ON}(1+\Delta)$$

$$t_{ON}2 = t_{ON}(1-\Delta)$$

where $t_{ON}1$ is the first ON time, $t_{ON}2$ is the second ON time, $t_{ON}$ is the ON time input, and $\Delta$ is the phase difference from the phase controller.

The phase controller 156 receives a phase signal from a phase detector 150 and generates a phase adjustment output in response to the phase signal indicating a measured phase measurement. In some embodiments, the phase controller is a proportional controller. The phase detector receives a phase feedback signal 152 which is connected to the first drive signal 142 coupled to the gate from the first converter and a phase feedback signal 154 which is connected to the second drive signal 144 coupled to the gate from the second converter. The phase feedback or gate signals are compared to measure the phase difference between the two phase feedback signals at the phase detector 150 and the resulting phase signal is a phase detection output indicating the measurement that is provided to the phase controller 156. In some embodiments when the phase difference is 180 degrees, the phase signal is 0.

The voltages on the auxiliary windings of the first inductor 112 and the second inductor 116 may be taken as feedback signals that are labeled as AUX 1 114 and AUX 2 118. The AUX 1 and AUX 2 signals are provided to the cycle-by-cycle controller to determine a start time for the first and second drive signals 142, 144. Alternatively, the drain voltage of the first switch 130 and the second switch 132 or the current through the first and second inductors 112, 116 may be used to define a start time for the first and second drive signals. Any other suitable signal may be measured that indicates the power output of the respective converter with respect to time. The AUX/Drain/Current signals are used by the cycle-by-cycle controller to determine when to turn on the first switch and the second switch using drive signals as described in more detail below.

Figure 2:
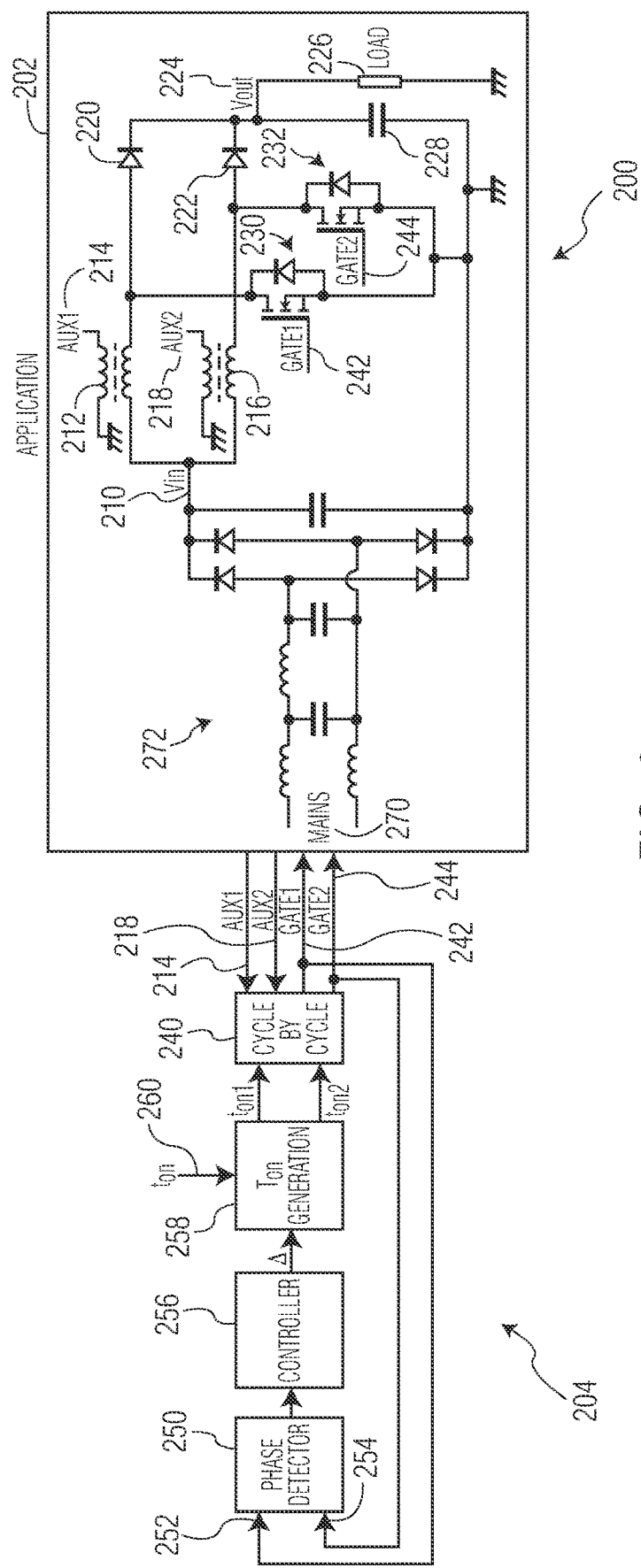
FIG. 2 is a diagram of an AC-DC interleaved boost converter.

FIG. 2 is a diagram of an AC-DC (Alternating Current to Direct Current) interleaved boost converter 200 with an application 202 and a control system 204. The application has a diode bridge rectifier 272 that receives an AC input 270, for example a mains voltage and generates a DC output. This output is the rectified input voltage 210 to the interleaved boost converter section. The boost converters are the same as in FIG. 1 and use two MOSFET transistor switches 230, 232 to interleave the power from the two transistor switches 230, 232 to the output 224 at a common node to power the load 226. The first converter receives the rectified input voltage 210 at a first inductor 212 that is coupled to the drain of the first switch 230 and to a first series output diode 220. The second converter receives the rectified input voltage 210 at a second inductor 216 that is coupled to the drain of the second switch 232 and to a second series output diode 222. The sources of the two transistor switches 230, 232 are coupled to ground. A load 226 is coupled to the output 224 and shown here as within the application. The output is filtered by a parallel grounded capacitor 228.

Phase feedback signals are measured from the first drive signal 242 and the second drive signal 244 from the cycle-by-cycle controller and applied as phase feedback signals 252, 254 to a phase detector 250. As mentioned above, the phase may be measured at any of a variety of different points on each converter. The phase detector 250 measures the phase difference between the two converters using the phase feedback signals 252, 254. In some embodiments, the phase feedback signals are combined to produce a phase difference voltage to a phase controller circuit 256. If the two converters are completely out of phase, then the output will be zero. In some embodiments, the phase feedback signals are used to produce an output that is a numerical representation of the phase difference. The phase controller uses the phase detector output and generates a phase adjustment output. This may be performed using an analog amplifier or in the digital domain. This phase adjustment output, Δ, is applied to a differential ON time generation circuit 258 that combines the phase difference with an external torr value to generate time duration output signals, $t_{ON}1$, $t_{ON}2$, to drive a cycle-by-cycle controller 240, also referred to as a cycle controller, and adjust the phase between the first and the second phase feedback signals toward 180 degrees.

As in the example of FIG. 1, the cycle-by-cycle controller 240 controls the two transistor switches 230, 232 with respective first drive signal 242 and the second drive signal 244 applied to the gates of the switches. The cycle-by-cycle controller 240 adjusts the first drive signal 242 and the second drive signal 244 using the time duration output signals and the AUX 1 214 and AUX 2 216 signals that, in this example, are measured at the auxiliary windings of the first inductor 212 and the second inductor 216, respectively to interleave the power phase of the two converters onto the output 224. The control loops and the interleaved converter sections of the configurations of FIG. 1 and FIG. 2 are shown as identical, but either or both may be modified to suit different applications.

Figure 3:
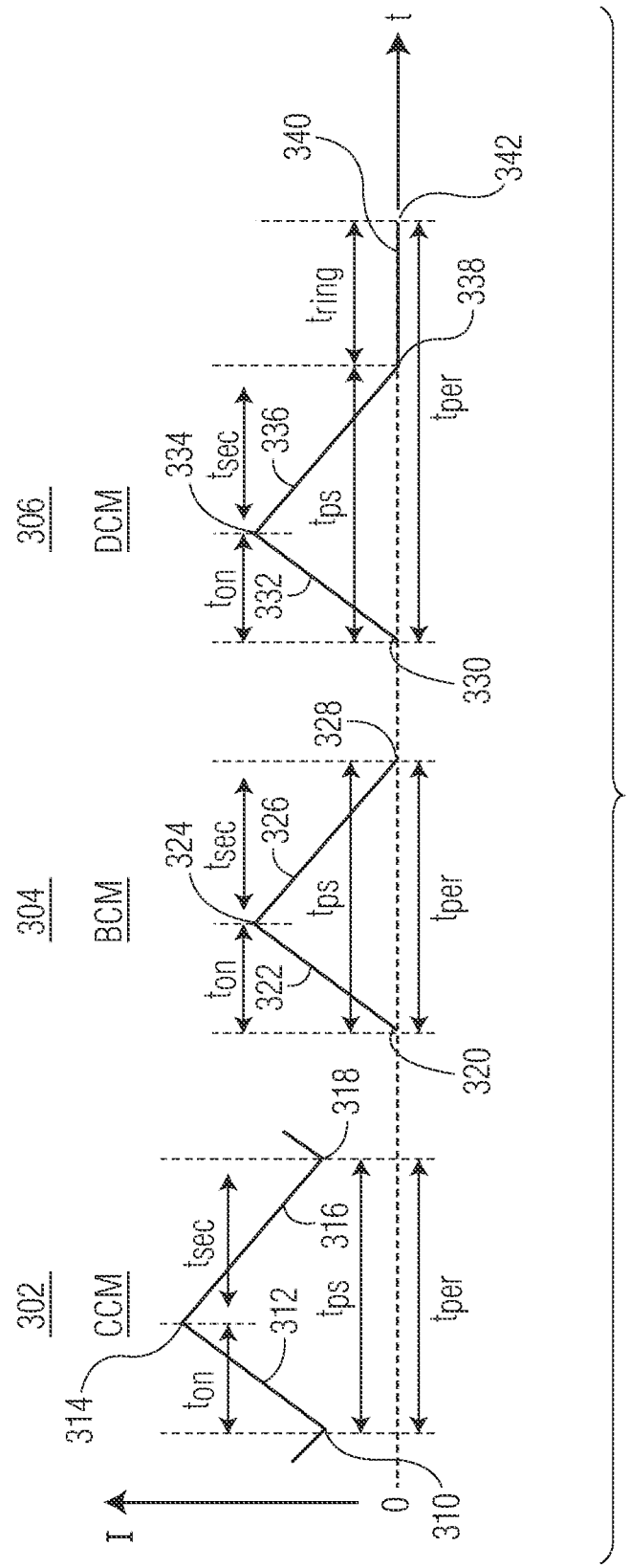
FIG. 3 is a graph of three different operational modes of an interleaved boost converter.

FIG. 3 is a graph of three different operational modes of an interleaved converter, for example the ones of FIG. 1 and FIG. 2 and variations thereof. The graph shows inductor current of one of the converters on the vertical axis against time on the horizontal axis. The solid-state switches of an interleaved PFC boost converter allow the converter to be operated in different modes. For medium and high-power applications, a CCM (Continuous Conduction Mode) is common. The CCM has a continuous input current which results in low conducted electromagnetic interference (EMI).

The first mode 302 represents CCM in which the inductor current never reaches zero and so the converter is conducting continuously. At the start of a power phase 310, the inductor current has reached its lowest point and the cycle-by-cycle controller turns the gate of the converter switch to ON. The inductor current increases through a primary stroke 312 reaching a peak at a point 314 corresponding to the transition to a secondary stroke. The duration of the primary stroke is the gate ON time indicated as torr. After the gate is switched off the current declines through the secondary stroke 316 until the end of the period of the power cycle as defined by the primary stroke and the secondary stroke. The end of the second stroke 318 corresponds to the beginning of the next period and the start of the next primary stroke.

If the entire period is viewed as 360 degrees by analogy to sine waves, 180 degrees is exactly the middle. If the two converters are interleaved so that the primary stroke of the second converter starts at the midpoint of the period of the second converter and the point 314 is exactly in the middle, then the input current of the interleaved converter will be approximately a constant current. As the first converter inductor current is decreasing, the second converter inductor current is increasing. The position of the peak at the point 314 is dependent on input voltage and output voltage of the converter at low mains voltages, the peak is closer to the end and at high mains voltages, the peak is closer to the beginning. The output voltage is controlled to a value, the ripple voltage, caused by switching, for example may be further reduced with additional filtering as appropriate.

The second mode 304 is commonly referred to as BCM (Boundary Conduction Mode) or sometimes as CrCM (Critical Conduction Mode). In this mode, the primary and secondary stroke are very similar except that the gate of the converter switch is only turned ON when the inductor current reaches zero. The initial zero crossing 320 is the beginning of the primary stroke 322 of the ON time in the BCM mode 304. At the peak current time 324 the transition is made and the switch is set to OFF. The inductor current decreases during the secondary stroke 326 until a zero crossing 328. The period in BCM mode may be increased by increasing the ON time and thereby increasing the primary stroke. The secondary stroke will accordingly become longer as well. Increasing the period also increases the inductor current as the current becomes higher during the primary stroke. The described control loop of FIG. 1 may be used to change the ON time of a primary or master converter to increase or decrease the inductor current and the period. The secondary or slave converter may be matched to that period time or ON duration by adjusting the ON time of both converters, e.g., increasing the torr of one converter while decreasing the torr of the other converter. The timing may be adjusted through the phase detector and phase controller until the entire period is aligned to be out of phase with the first converter. In some embodiments, the phase between the two interleaved converters is aligned by adjusting only the duration of the switch ON time of both converters. This does not necessarily require adjustments to a ringing phase of the converters.

The third mode 306 is commonly referred to as DCM (Discontinuous Conduction Mode) because the inductor current (=input current) has a dead period where no power is delivered. There is an added delay after the secondary stroke before the next primary stroke. In the DCM mode 306, the first stroke begins at a zero inductor current crossing time 330 with the switch turned ON. The primary stroke 332 extends through a current rise time and a peak inductor current 334 at which the switch ON time is ended and the inductor current falls during the second stroke 336 to a zero inductor current crossing 338. Instead of starting the next period at the end of this power phase, the switch remains off for an additional time 340 during a ringing phase. The end of the ringing phase is the end of the period 342 at which time the next power phase begins with another primary stroke 332 by turning the switch to ON with a drive signal from the cycle-by-cycle converter.

The power phase may be considered as the time during which power is drawn from the input node. The ringing phase is a time during which the inductor current is ringing around zero current due to the inductor value and the and capacitance of the physical circuit. The drain voltage of the MOSFET switch rings around the input voltage in this phase. If the amplitude of the drain voltage ringing is below the threshold of the output diode, then no power will reach the output node during the ringing phase.

Figure 4:
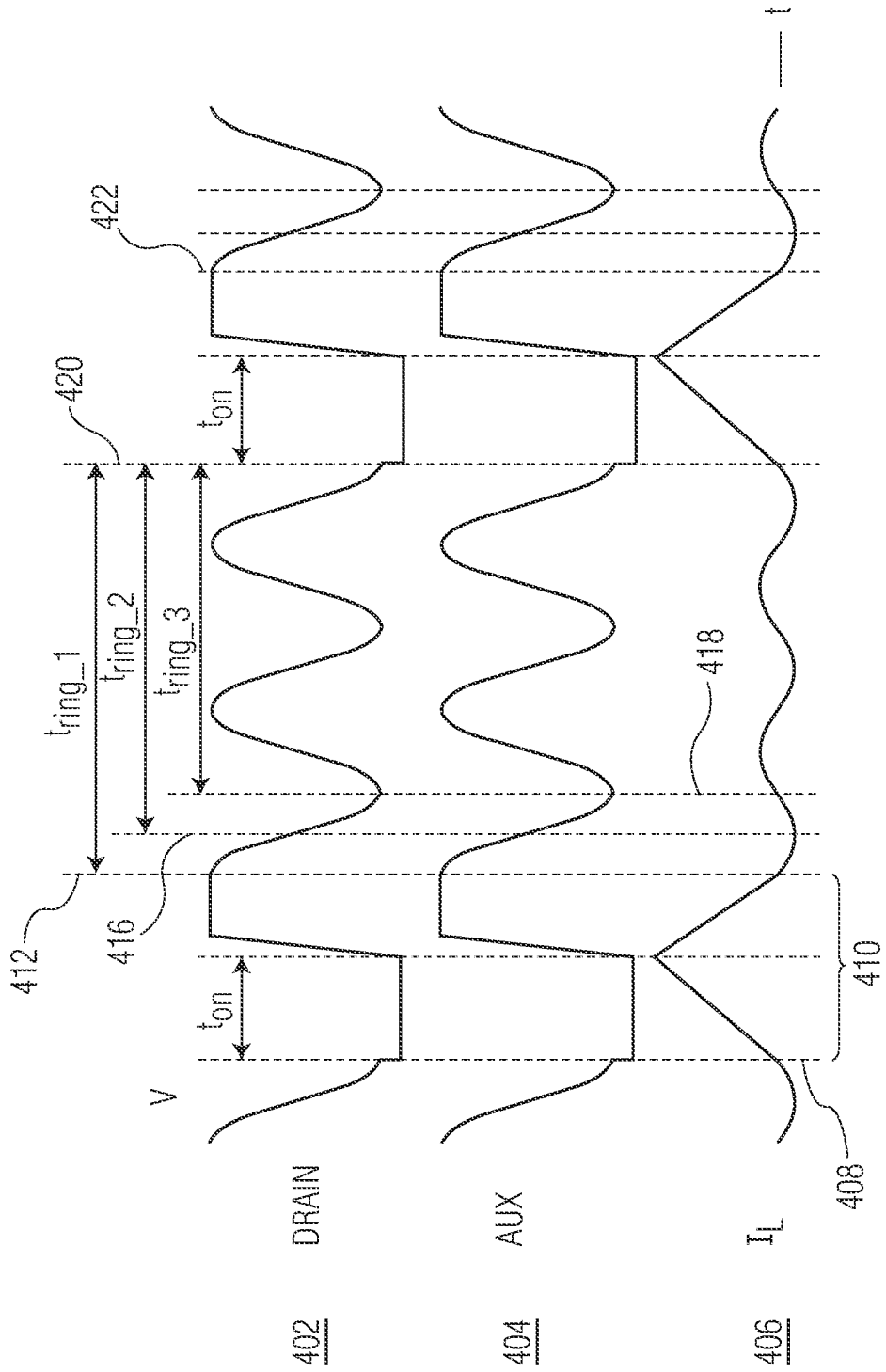
FIG. 4 is a graph of voltage and current measured during a power phase and a ringing phase of an interleaved boost converter.

FIG. 4 is a graph of the voltage measured at two different locations and the measured inductor current to characterize the ringing phase as in a DCM mode. At 402, the drain voltage is graphed on the vertical axis against time on the horizontal axis. At time 408 a power phase 410 begins with the gate enabled or ON. The gate is enabled for a time determined as torr and then it is disabled. The drain voltage immediately rises. The start of the ringing phase may be measured in different ways. One suitable event is when the drain voltage begins to fall as shown at time 412. Another suitable event is when the drain voltage hits zero as shown at time 418.

At 404 the voltage of the auxiliary winding of the inductor is shown. This voltage is similar to that of the drain and the same suitable occurrences apply as with the drain voltage. The shape of the curve is the same as for the drain voltage only the average value of the drain voltage 402 is Vin and the average value of the AUX voltage 404 is 0. The zero crossing 416 of the AUX voltage is a good start time for the ringing phase because a zero crossing is easy to detect.

At 406 the inductor current is shown on the vertical axis against time. At the time 412 when the power phase 410 ends, the inductor current has a zero crossing. It then starts ringing and has a second zero crossing at a second later time 418. This time corresponds to a first valley in the ringing voltage of the drain voltage 402 and the inductor auxiliary winding voltage 404. Any one or more of these events may be used to determine a start time for the ringing phase.

The end of the ringing phase 420 marks the beginning of the next power phase. The gate is enabled for the duration of the ON time. The primary stroke begins. At the end of the ON time, the gate is disabled and the inductor current reduces until the start 422 of the next ringing phase. In DCM mode, the duration of the ON time is regulated to control the output of the converter and the duration of the ringing phase.

While any time may be selected for the start of the next power phase, the switch operates best when the voltage across the transistor channel is as close as possible to zero volts. This may be referred to as a valley for the drain or inductor measurement. The time of the ringing phase is accordingly adjusted to align with a valley. The positions of the valleys are determined by the physical characteristics of the converter circuit and may vary with design and process as well as with the operating frequency and temperature. Selecting a specific valley for the end of the ringing phase may be referred to as a valley lock. As compared to BCM and CCM, DCM uses an additional control mechanism to interleave the two converters. The period in DCM mode may be regulated first with an ON time as with BCM and CCM. The period is also regulated in part with a second parameter of the duration of the ringing phase which may be done using valley lock. The valley lock determines how long the period is extended by the ringing phase past the end of the power phase and the system stays on the same valley through each cycle or period.

Figure 5:
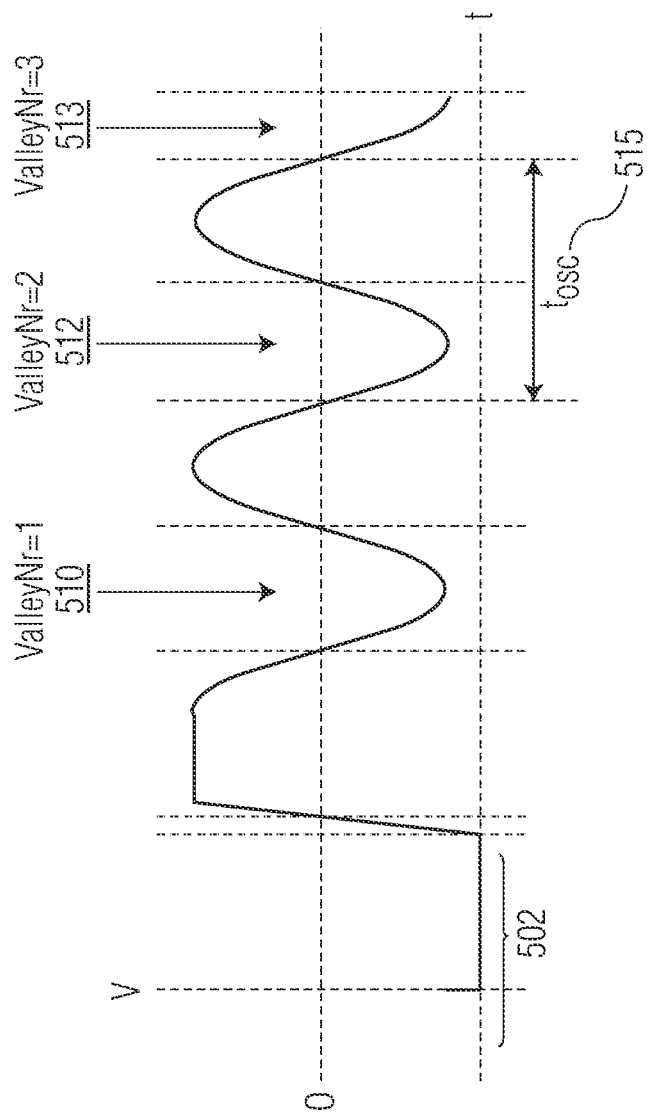
FIG. 5 is a graph of valleys in a drain voltage during a ringing phase of an interleaved boost converter.

FIG. 5 is a graph of an example of a suitable measure of a converter such as the drain voltage, auxiliary winding voltage, or another suitable indicator, on the vertical axis plotted against time on the horizontal axis. After a power phase, the voltage starts to ring and transitions through a first valley 510, a second valley 512, a third valley 513 and more. There may be many more valleys depending on the damping factor of the ringing. The damping factor like the oscillation frequency of the ringing is determined by the physical characteristics of the converter at the time. The controller may select any of the three valleys or a subsequent valley, such as the eighth, twelfth, or another valley. The controller may also determine the oscillation frequency of the ringing 515 of the converter by measuring the time between valleys or between zero crossings. The oscillation frequency may be affected by the damping factor but will be about the same value for nearby valleys. For the inductor auxiliary winding, the zero voltage value is marked on the highest dashed horizontal line. For the drain voltage the highest dashed line corresponds to the input voltage, Vin, and the lowest horizontal dotted line is corresponds to zero voltage. The measurement of the oscillation time of the ringing phase, i.e., the master ringing phase time, can be from the same converter cycle or from previous cycles and then filtered. So, when in certain situations no measurements can be made a stored value can be recalled and used.

For an interleaved converter, the two converters should be separated by 180 degrees. With the valley lock, a primary converter, referred to as the master converter, may be controlled and operated. In some instances, the secondary converter, referred to as the slave converter, may be controlled and operated with the same valley lock. In this case, the number of valleys for the master is counted and the same number of valleys is counted and directly applied to the slave. However, in some instances, the oscillation frequency in the ringing phase may not align with the oscillation of the master converter. If the ringing phase time is copied from the master to the slave, then the time may not correspond to a valley. If the number of valleys is copied from the master to the slave, then the ringing time may not correspond to that of the master. In either case, the duration of the ringing phase may be adjusted to be more suitable for the slave.

Figure 6:
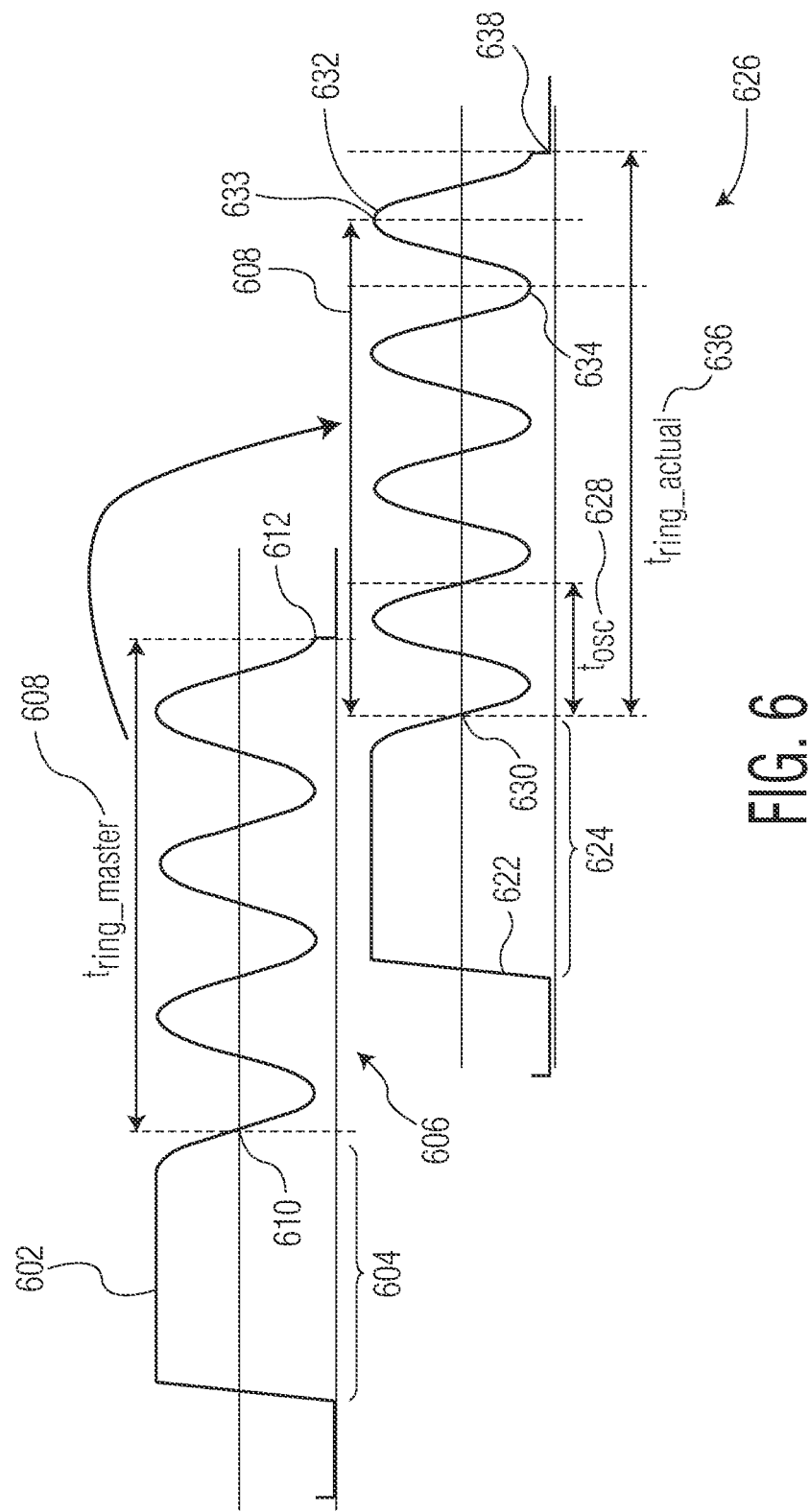
FIG. 6 is a graph of first and second cycle signals and copying a master ringing phase time to a slave converter.

FIG. 6 is graph of the first and second cycle signals to show copying a master ringing phase time to the slave converter. The first cycle signal 602, for example one of the signals shown in FIG. 4 from the first converter has a power phase 604 during which power is applied to the output and a ringing phase 606 during which the voltage output is blocked by the output diode. The duration of the ringing phase 606 is controlled by the first drive signal that drives the switching transistor in the first converter. At a selected valley 612, the drive signal goes high and the gate of the transistor is enabled. This ends the ringing phase 606 and starts a new power phase. The duration of the ringing phase 606 can be measured from different start times but ends with the selected valley 612 which is a local minimum of the first cycle signal 602. In this example a master time duration 608 starts with a first zero crossing 610 of the first cycle signal 602 and ends at the last valley of the ringing phase. This time duration may be determined by an external controller to control the output power of the converter, the frequency of the converter, or based on other parameters of the converter operation.

The second cycle signal 622 also has a power phase 624 and a ringing phase 626. The second cycle signal is delayed with respect to the first cycle signal 602 by an amount approximately equal to 180 degrees or one-half cycle so that the outputs of the two converters are interleaved. The slave ringing phase time is determined as starting at an analogous or corresponding point, a first zero crossing 630 of the second cycle signal, to the master ringing phase. The second cycle signal 622 of the slave has an oscillation frequency 628 which is higher than that of the master for shorter wavelengths. As shown, the oscillation frequency is measured based on a time between zero crossings 630 in the ringing phase but any other measure may be made. The oscillation frequency is subject to damping, perturbations, and other effects and will change over time so that for a long ringing phase with many valleys, the oscillation frequency for later valleys may be different from the oscillation frequency for earlier valleys. In some embodiments the oscillation frequency is measured using the second and third zero crossings, but any other positions may be used. Multiple measurements may be averaged for longer ringing phase times. Alternatively, the measured oscillation time can be a result determined by measuring earlier cycles and the results may also be filtered.

The master time duration 608 is applied to the second cycle signal 622, however as shown, the master time duration does not end at a local minimum or valley of the second cycle signal. Instead, the master time duration ends at time 632 just after a peak 633 or local maximum of the second cycle signal. Instead of switching the second converter to ON at the maximum, the next valley 638 is chosen. The slave ringing phase time is longer than the master time duration 608 so that the power phase of the second converter begins at a next valley 638 of the second cycle signal. The time duration indicated as $t_{ring\_actual}$ 636 is the actual time at which a switching decision is made at the cycle-by-cycle controller.

At the end of the actual time 636 at the current valley 634 the slave ringing time measurement is equal to $t_{ring\_actual}$ and the cycle-by-cycle controller compares the slave curve to the copied master time duration 608 ending after the next peak at time 632. The cycle-by-cycle controller can choose the current valley at 634 or wait at least one valley at 638, if, for example, the distance from the current valley 634 is more than a half oscillation time away from the end of the copied master ringing phase time at 632, as shown. This test may be performed at each cycle and at each valley on each cycle. The check may be expressed as: $t_{ring\_master} - \frac{1}{2} t_{osc} \leq t_{ring\_actual}$.

The slave cycle is always lagging behind the master cycle so that a current master time duration may be applied to the current slave cycle as the cycles occur. When the oscillation frequency of the master and the oscillation frequency 628 of the slave are exactly the same then the master time duration can be copied to the slave and both converters will switch to the power phase in the valleys. However, due to, for example, spread in inductor values or parasitic capacitances between the two converters, the oscillation frequencies may not always be the same. The adjustment shown from the master time duration to the next valley ensures that the slave also uses valley switching.

Figure 7:
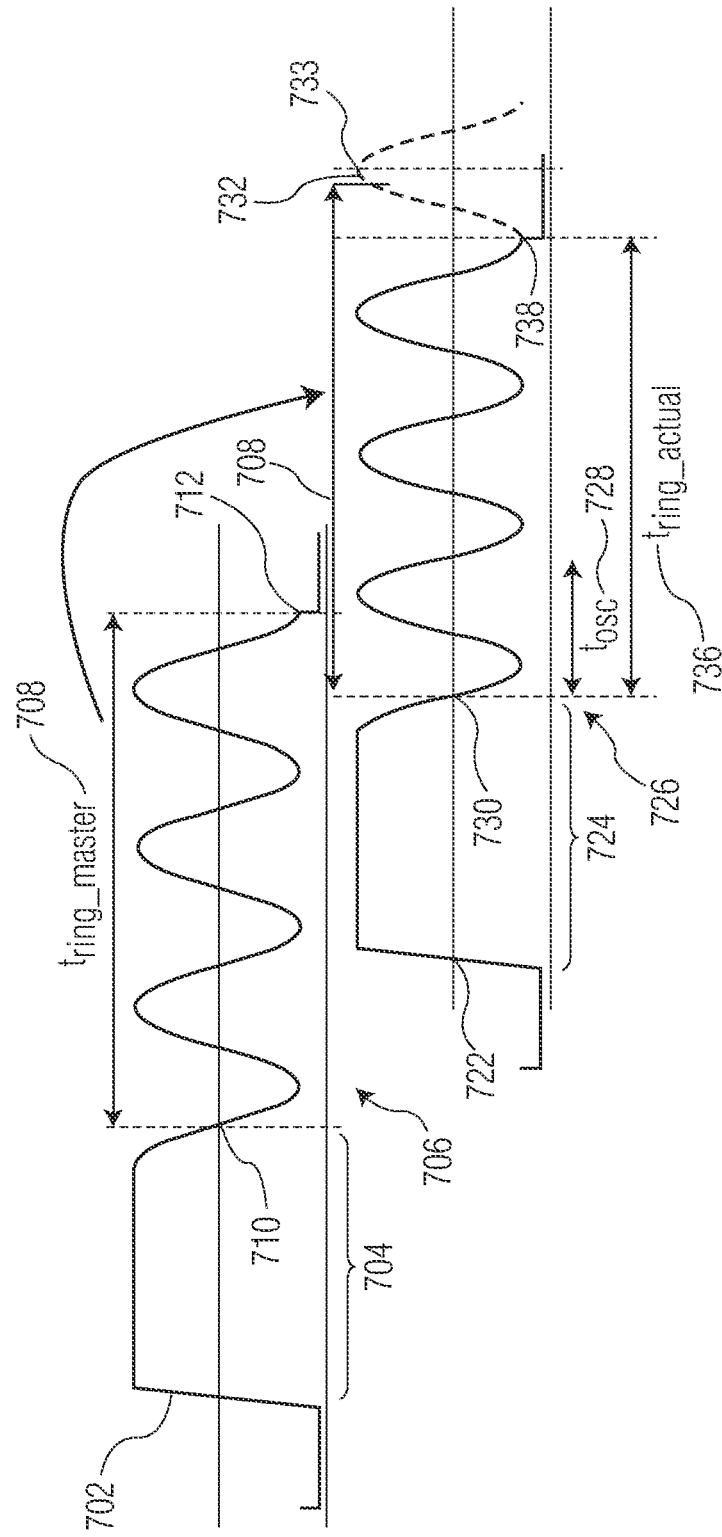
FIG. 7 is a graph of first and second cycle signals and an alternative copying of a master ringing phase time to a slave converter.

FIG. 7 is a graph of the first and second cycle signals to show a different situation of copying a master ringing phase time to the slave converter. In this example the oscillation time of the ringing of the slave is a little longer so that the near valley 738 is the valley before the end of the master time duration 732 which falls before a peak 733 of the second cycle signal 722 in the ringing phase 726. In other words, the closest valley to the end of the master time duration 708 is the valley at the end of the actual time 736.

As in the previous example, the first cycle signal 702 of the master converter has a power phase 704 and a ringing phase 706. The time duration 708 of the ringing phase 706 is measured from a first zero crossing 710 at the end of the power phase 704 to the bottom of the last valley 712 when the master converter is switched on. When the master converter is switched on a new power phase begins and the ringing phase ends. This time duration is applied to the second cycle signal 722 of the slave starting at the first zero crossing 730 at the end of the power phase 724 of the second cycle signal 722. At the moment that the actual time, $t_{actual\_time}$, 736 reaches a near valley 738, the distance to the end of the master time duration at 732 is less than a half oscillation time away. As a result, the cycle-by-cycle controller switches the slave controller at the time of the bottom of that near valley 738.

A similar approach may be applied using cycle signals from other aspects of the converter circuits such as transistor drain current, among others. As further alternatives, a similar result may be obtained using different techniques. In some embodiments, the time duration of the master ringing phase time is based not on a particular time duration, e.g., milliseconds or microseconds, but on a number of valleys 634, 638 of the ringing phase of the cycle signal. The valley number may then be applied to the second cycle signal from the slave converter by counting the number of valleys in the second cycle signal from the slave converter. This approach will interfere with the interleaving phase relationship at the output when the spread between the oscillation frequency of the master is too different from the oscillation frequency of the ringing phase of the slave. When the ringing frequency difference is great and the valley number is large the disparity may become so large that the slave converter may never be switched on. Accordingly, the examples above show selecting the closest valley number of the slave that matches to the ringing time of the master.

The selection of the closest valley may be expressed mathematically as choose earlier valley if $t_{ring\_master} - \frac{1}{2} t_{osc} \leq t_{ring\_actual}$ wherein $t_{ring\_master}$ is the time duration of the master ringing phase, $t_{osc}$ is the oscillation period time of the slave ringing phase time, and $t_{ring\_actual}$ is the time duration to the local minimum at the moment the decision is made to take this valley or a later one. In some embodiments, a decision is made at each valley to switch or wait until the next valley, i.e., the valley after the end of the master time duration. The first possible decision is at a valley within an oscillation cycle of the end of the $t_{ring\_master}$ time called the master time duration. The particular formulation may be modified based on the source of the first and second cycle signal, the ability to detect valleys and other parameters of the implementation.

In some embodiments, the check as defined by $t_{ring\_master} - 0.5 \cdot t_{osc} \leq t_{ring\_actual}$ may be performed at every valley. When this criterion is fulfilled, the current valley is chosen. If the valley is before the end of the master ringing time, but not a half of the oscillation time before, then the check is performed also on the next valley. It can be that this valley is after the master time duration, $t_{ring\_master}$. When the first valley is far before the master ringing time, then the checks continue until a valley is reached that meets the criterion. In other words, the check is performed at every valley until the criterion is reached.

Figure 8:
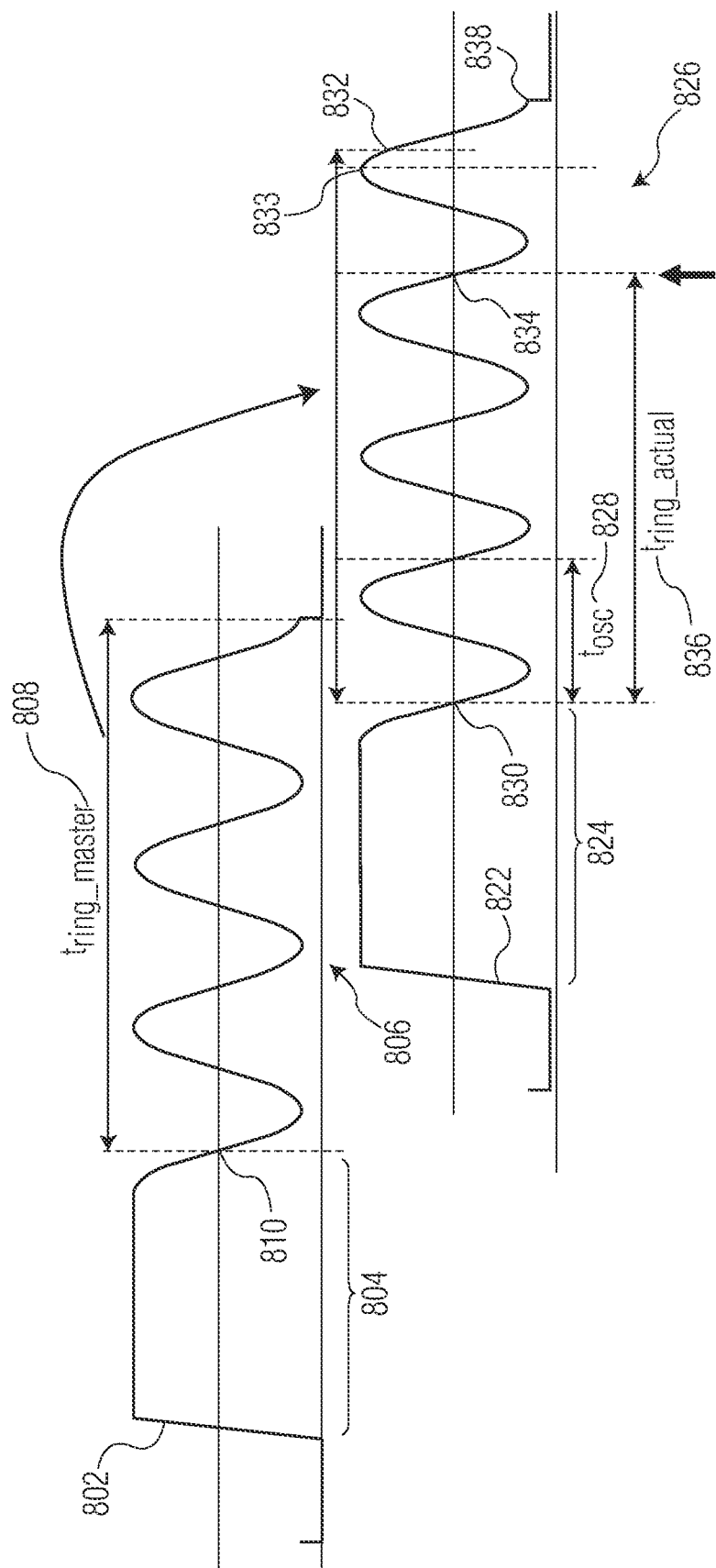
FIG. 8 is a graph of first and second cycle signals and copying a master ringing phase time to a slave converter using a zero crossing.

FIG. 8 is graph of the first and second cycle signals to show copying a master ringing phase time to the slave converter using a zero crossing. As in the previous examples, the first cycle signal 802, for example one of the signals shown in FIG. 4 from the first converter has a power phase 804 and a ringing phase 806. The duration of the ringing phase 806 is controlled by the first drive signal that drives the switching transistor in the first converter to enable the gate of the transistor and start the next power phase. In this example a master time duration 808 starts with a first zero crossing 810 of the first cycle signal 802 and ends at the last valley.

The second cycle signal 822 also has a power phase 824 and a ringing phase 826. The second cycle signal is delayed with respect to the first cycle signal 802 by an amount approximately equal to 180 to interleave the converter operation. The slave ringing phase time is also measured from a first zero crossing 830 of the second cycle signal. The second cycle signal 822 of the slave has an oscillation frequency 828 which is higher than that of the master for shorter wavelengths.

The master time duration 808 is applied to the second cycle signal 822 and ends at time 832 just after a peak 833 or local maximum of the second cycle signal. Instead of switching the second converter to ON at the maximum, the next valley 838 is chosen. The slave ringing phase time is longer than the master time duration 808 so that the power phase of the second converter begins at a next valley 838 of the second cycle signal. The time duration indicated as $t_{ring\_actual}$ 836 is the actual time at which a switching decision is made at the cycle-by-cycle controller. At the end of the actual time at the current zero crossing 834 the slave ringing time measurement is equal to $t_{ring\_actual}$ and the cycle-by-cycle controller compares the slave curve to the copied master time duration 808 ending after the next peak at time 832. The cycle-by-cycle controller can choose the next valley, on quarter cycle later or wait at least for the subsequent valley 838 at one and one quarter of a cycle later. In this case, the distance from the zero crossing 834 is more than three quarters of the oscillation time away from the end of the copied master ringing phase time at 832, as shown. This test may be performed at each cycle and at each valley on each cycle. The check may be expressed as: $t_{ring\_master} - \frac{3}{4} \cdot t_{osc} \leq t_{ring\_actual}$. The adjustment shown from the master time duration to the next valley ensures that the slave also uses valley switching.

Figure 9:
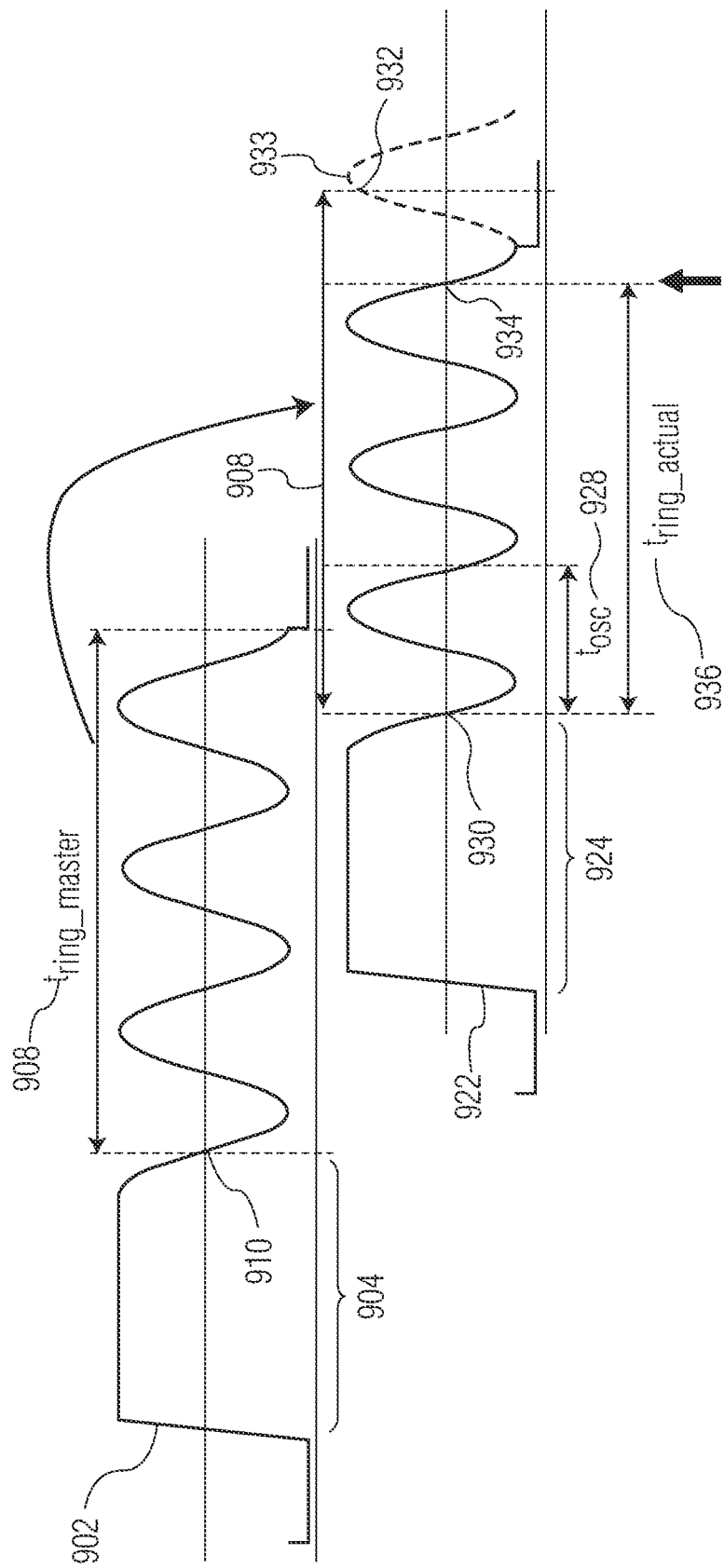
FIG. 9 is a graph of first and second cycle signals and an alternative copying of a master ringing phase time to a slave converter using a zero crossing.

FIG. 9 is a graph of the first and second cycle signals to show a different situation of copying a master ringing phase time to the slave converter using a zero crossing. As in the previous example, the first cycle signal 902 of the master has a power phase 904 and a ringing phase 906. The time duration 908 of the ringing phase 906 is measured from a first zero crossing 910 at the end of the power phase 904 to the bottom of the last valley when the master converter is switched on. This time duration is applied to the second cycle signal 922 of the slave starting at the first zero crossing 930 at the end of the power phase 924 of the second cycle signal 922. At the moment that the actual time, $t_{actual\_time}$, 936 reaches the selected zero crossing, the distance to the end of the master time duration at 932 is less than a three quarters of an oscillation time away. As a result, the cycle-by-cycle controller switches the slave controller at the time of the bottom of the near valley.

The selection of the closest valley may be expressed mathematically as $$\text{choose earlier valley if } t_{ring\_master} - \frac{3}{4} \cdot t_{osc} \leq t_{ring\_actual}$$

wherein $t_{ring\_master}$ is the time duration of the master ringing phase, $t_{osc}$ is the oscillation period time of the slave ringing phase time, and $t_{ring\_actual}$ is the time duration to the zero crossing at the moment the decision is made to take the next valley or a later one. In some embodiments, a decision is made at each zero crossing to select a valley. The first possible decision is at a zero crossing within an oscillation cycle of the end of the $t_{ring\_master}$ time called the master time duration.

Figure 10:
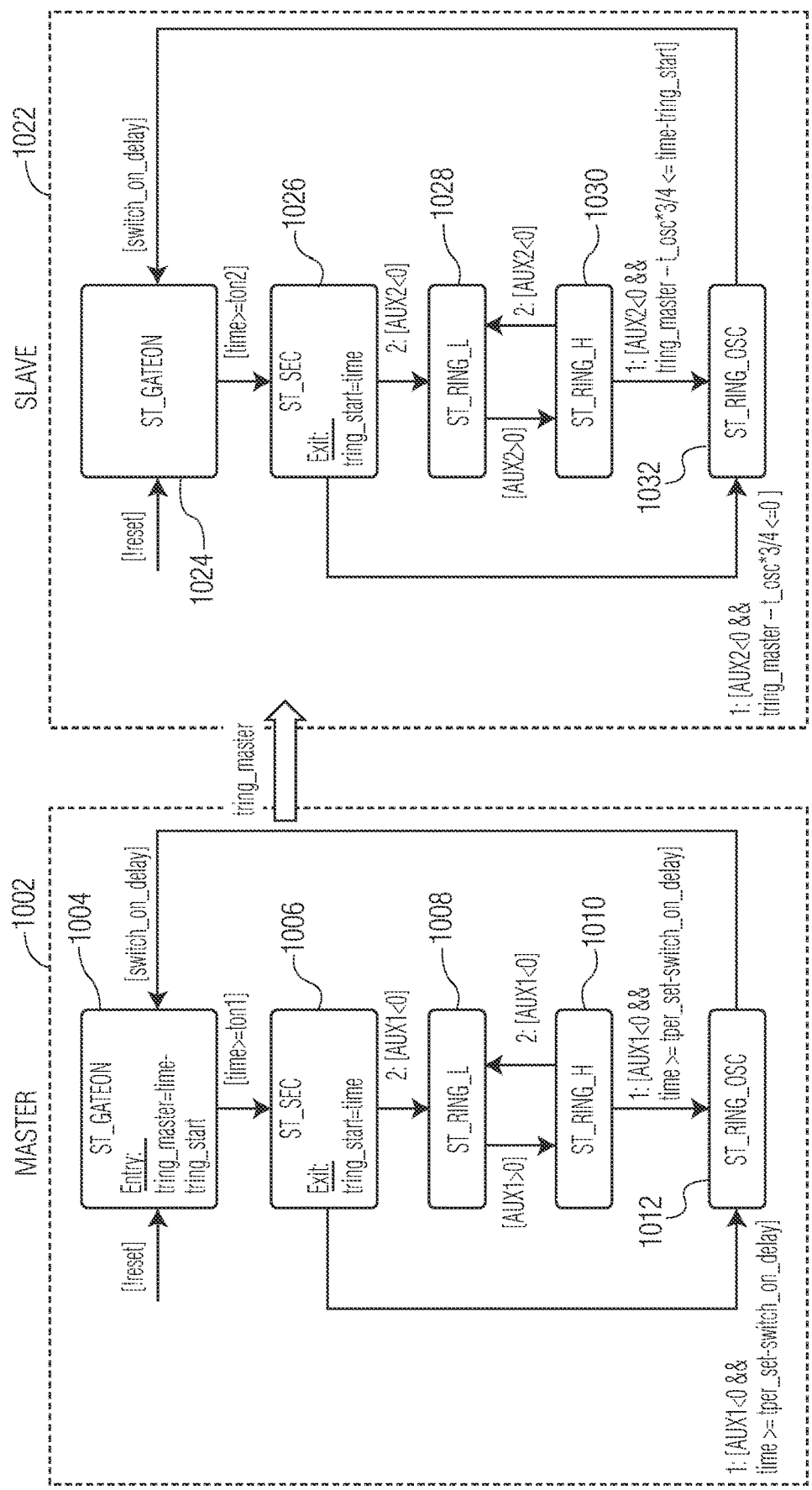
FIG. 10 is a diagram of dual state machines for copying a master ringing phase time to a slave converter.

FIG. 10 is a diagram of an example of dual state machines that may be operated to implement the master ringing phase time copying as described above. The state machines may be implemented in hardware using combinatorial logic or software or other implementations may be used. The master state machine 1002 has at least 5 states and so does the slave state machine 1022. These states correspond to operating conditions of the two converters of an interleaved boost converter as discussed herein. The states are Gate ON state 1004, 1024 (ST_GATEON), Secondary Stroke state 1006, 1026 (ST_SEC), Ring Low state 1008, 1028 (ST_RING_L), Ring High state 1010, 1030 (ST_RING_H), and Ring Oscillation state 1012, 1032 (ST_RING_OSC).

In operation, the master state machine 1002 and the slave state machine 1022 enter the Gate On states 1004, 1024, when the gate of the switch of the respective converter is turned on again. They exit the Gate ON states 1004, 1024 to the Secondary Stroke states 1006, 1026, when the gates are turned off. This will happen out-of-phase at two different times. The converters transition to the Ring Low states 1008, 1028 at the end of the power phase and the end of the second stroke when the ringing phase is started. The states will oscillate between Ring Low 1008, 1028 and Ring High 1010, 1030 states as the cycle signals, in this example AUX1, and AUX2 oscillate. When the ringing phase is over, then the converters transition through the Ring Oscillation states 1012, 1032 back to the Gate ON states 1004, 1024.

The timing is indicated through the states for the master as a time, Ling master, is copied from the master 1002 to the slave 1022. At the exit by the master from the Secondary Stroke state 1006, the time $t_{ring\_start}$ is set. When the gate is turned on again the time, $t_{ring\_master}$, is the actual time minus the time, $t_{ring\_start}$. The $t_{ring\_master}$ time is copied to the slave state machine. The $t_{ring\_start}$ of the slave is also set when the slave exits the Secondary Stroke state 1026. Turning on the gate at the slave at the Ring Oscillation state 1032 is dependent on $t_{ring\_master}$ which has been copied over from the master.

In some embodiments, an update of the valley number for entering the Gate ON state 1024 of the slave 1022 is only performed when the master 1002 also changes the valley number used for its transition to the Gate ON state 1004. When the valley number of the master does not change, the valley number of the slave will also not change. When the valley number of the master changes, then the mechanism described above is executed.

As described, the phase control loop for the interleaved boost converter may be operated in a DCM mode with valley switching. Different ON times for both converters may be used to change the frequency of the converters and the valley switching adjusts to compensate for any ON time and phase changes. The described implementation may be used in interleaved boost converters running in BCM and DCM modes, especially, but not necessarily using valley switching. As described, in many operations circumstances, the two interleaved converters will run in DCM mode using different valley numbers. Nevertheless, the time duration of the ringing phase of one converter is used to determine the time duration of the ringing phase of the other converter.

In embodiments, the oscillation may be measured for the master and the slave by measuring the time between two valleys or the time between two zero crossings of auxiliary inductor winding signals or in other ways. The oscillation time between, for example, the second and the third valley or other subsequent valleys, peaks or zero crossings may be used. The reliability is improved when the oscillation time is stored and filtered, such that the oscillation time is known even when the measurement cannot be performed in a current cycle.

Similarly, techniques herein use a start of the ringing phase as a time measurement. This time may be selected using a variety of different criteria. Generally, a time may be selected that corresponds roughly to the time at which the output diode of the master converter stops conducting power to the output. This marks the end of the power stage. There are several different other events that occur at about this time. These include the inductor current becoming zero or the inductor auxiliary winding or switch drain voltage of the converter dropping or having its first local minimum or zero crossing.

The described techniques allow the time duration of the slave ringing phase time to be fixed based on the master ringing phase time. This allows the frequency of each converter to be independently controlled and allows for the boost converter to operate as an interleaved PFC in DCM with valley switching. In addition, it inherently supports BCM operation by providing for an extremely short ringing phase.

Figure 11:
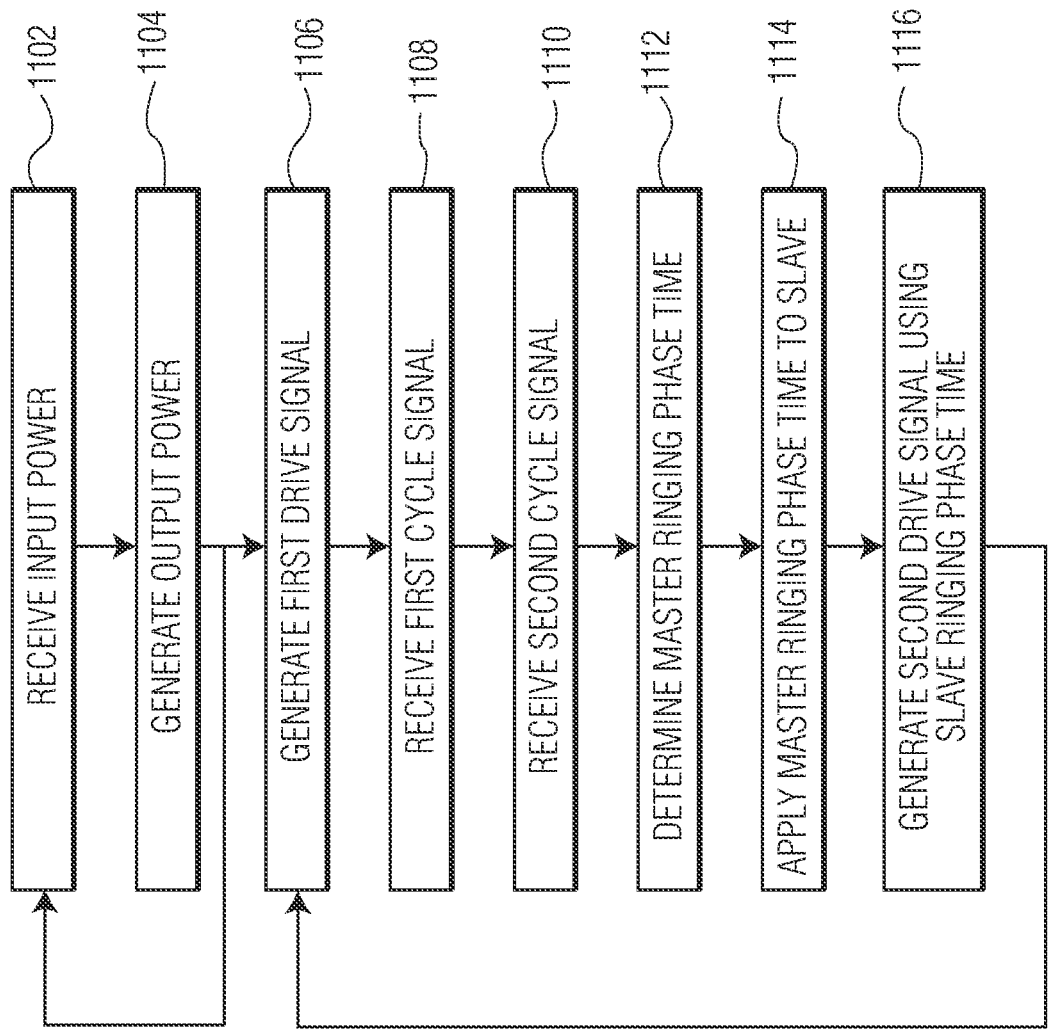
FIG. 11 is a process flow diagram of operating an interleaved boost converter.

FIG. 11 is a process flow diagram of a method of operation suitable for use with the interleaved boost converter of FIG. 1 and FIG. 2. At 1102 an interleaved boost converter with two interleaved converters receives an input power at a first converter and at a second converter. At 1104, the converters generate an output power as an interleaved output of the first converter output power and the second converter output power. These operations continue during the operation of the boost converter.

At 1106, a cycle-by-cycle controller generates a first drive signal to control the switching of the first converter. At 1108, the cycle-by-cycle controller receives a first cycle signal from the first converter and at 1110 a second cycle signal from the second converter. The first and the second cycle signals have a power phase time corresponding to a power phase of the respective converter and a ringing phase time corresponding to a ringing phase of the respective converter. The cycles are operating out-of-phase to interleave the power output of the two interleaved converters.

At 1112, the cycle-by-cycle controller determines a master ringing phase time of the first cycle signal and at 1114 applies the master ringing phase time to the second cycle signal to determine a slave ringing phase time. At 1116, the cycle-by-cycle controller generates a second drive signal to control switching of the second converter in accordance with the slave ringing phase time. With the second drive signal, the process continues with additional first drive signals at 1106 and control of the slave ringing phase time as described during the operation of the boost converter.

In some embodiments, the master ringing phase time has a master time duration corresponding to a number of valleys of the ringing phase of the first cycle signal. The master time duration may be applied to the ringing phase of the second cycle signal so that the slave ringing phase time may be determined as ending at a valley of the ringing phase of the first cycle signal that is closest to an end of the master time duration. The master time duration may begin at a first local minimum of the first cycle signal and end after the number of valleys. The valleys may be local minima of the ringing phase of the first cycle signal so that determining the closest valley includes selecting a local minimum of the second cycle that is closest to the master time duration.

Embodiments of the present invention provide a mechanism to control a phase between interleaved boost converters particularly suitable for operation in Discontinuous Conduction Mode but also suitable for other modes. This mechanism may be applied to boost converters for a wide range of different applications and power capabilities for DC-DC and AC-DC applications. The mechanism may use analog or digital controller componentry.

The connections as discussed herein may be any type of connection suitable to transfer signals or power from or to the respective nodes, units, or devices, including via intermediate devices. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals.

The described examples may be implemented on a single integrated circuit, for example in software in a digital signal processor (DSP) as part of a radio frequency integrated circuit (RFIC). Alternatively, the circuit and/or component examples may be implemented as any number of separate integrated circuits or separate devices interconnected with each other in a suitable manner. These examples may alternatively be implemented as soft or code representations of physical circuitry or of logical representations convertible into physical circuitry, such as in a hardware description language of any appropriate type.

Boundaries between the above described operations are provided as examples. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An interleaved boost converter, comprising:
   a first converter operating as a master converter to receive an input power and generate a first converted output power;
   a second converter operating as a slave converter to receive the input power and generate a second converted output power, wherein the first converted output power and the second converted output power are interleaved;
   a cycle controller to generate a first drive signal to control switching of the first converter and a second drive signal to control switching of the second converter, to receive a first cycle signal from the first converter and a second cycle signal from the second converter, wherein the first cycle signal and the second cycle signal have a power phase time corresponding to a power phase of a respective converter and a ringing phase time corresponding to a ringing phase of the respective converter,
   the cycle controller to determine a master ringing phase time of the first cycle signal and to apply the master ringing phase time to the second cycle signal to determine a slave ringing phase time, the cycle controller generating the second drive signal in accordance with the slave ringing phase time.

2. The interleaved boost converter of claim 1, wherein the master ringing phase time comprises a number of valleys of the first cycle signal during the first cycle signal ringing phase and wherein the cycle controller determines the slave ringing phase time by counting a same number of valleys of the ringing phase of the second cycle signal so that the second drive signal is generated after the same number of valleys.

3. The interleaved boost converter of claim 1, wherein the master ringing phase time comprises a master time duration corresponding to a number of valleys of the ringing phase of the first cycle signal, wherein the cycle controller applies the master time duration to the ringing phase of the second cycle signal and determines the slave ringing phase time as ending at a valley of the ringing phase of the second cycle signal that is closest to an end of the master time duration.

4. The interleaved boost converter of claim 3, wherein the cycle controller determines the slave ringing phase time by determining a slave oscillation time of the ringing phase of the second cycle signal, selecting a valley before the end of the master time duration applied to the ringing phase of the second cycle signal, determining a distance between the selected valley and the end of the master time duration applied to the ringing phase of the second cycle signal, if the distance is less than one half of the slave oscillation time, then determining that the selected valley is the closest, and if the distance is more than one half of the slave oscillation time, then determining that a subsequent valley is the closest.

5. The interleaved boost converter of claim 3, wherein the master time duration begins at a first local minimum of the first cycle signal and ends after the number of valleys, the valleys being local minima of the ringing phase of the first cycle signal.

6. The interleaved boost converter of claim 3, wherein the closest valley is determined by selecting a local minimum of the second cycle signal that is closest to the master time duration.

7. The interleaved boost converter of claim 1, wherein receiving the first cycle signal comprises receiving a first voltage from auxiliary windings of a first inductor of the first converter and wherein receiving the second cycle signal comprises receiving a second voltage from auxiliary windings of a second inductor of the second converter.

8. The interleaved boost converter of claim 7, wherein determining a master ringing phase time comprises detecting zero voltage crossings of the first voltage.

9. The interleaved boost converter of claim 1, wherein receiving the first cycle signal comprises receiving a first voltage from a drain of a first transistor of the first converter and wherein receiving the second cycle signal comprises receiving a second voltage from a drain of a second transistor of the second converter.

10. The interleaved boost converter of claim 1, wherein the cycle controller is further to store the master ringing phase time and to apply the stored master ringing phase time to determine a subsequent slave ringing phase time.

11. The interleaved boost converter of claim 1, further comprising:
   a differential ON time generation circuit to generate a first ON time for the first converter and a second ON time for the second converter using an ON time input, the first and the second ON times determining a duration during which the first and the second converters are switched on, and
   wherein the cycle controller is configured to receive the first ON time and the second ON time and to generate the first drive signal and the second drive signal using the first ON signal and the second ON signal, respectively.

12. The interleaved boost converter of claim 11, further comprising:
   a phase detector to receive a first phase feedback signal of the first converter and a second phase feedback signal of the second converter to measure a phase difference between the first and the second phase feedback signals and to produce a phase detection output indicating the measurement,
   a phase controller coupled to the phase detector to receive the phase detection output and to generate a phase adjustment output in response to the phase detection output, wherein
   the differential ON time generation circuit is coupled to the phase controller to receive the phase adjustment output and to generate the first and the second ON times in response thereto to adjust the phase between the first and the second phase feedback signals toward 180 degrees.

13. The interleaved boost converter of claim 1, wherein the master ringing phase time comprises a time between an end of the power phase time and a start of a next power phase time when the first converter is operating in a Discontinuous Conduction Mode (DCM).

14. The interleaved boost converter of claim 1, wherein the first converter and the second converter are power factor correction (PFC) converters and the input power has an alternating current.

15. A method comprising:
receiving an input power at a first converter and at a second converter;
generating an output power as an interleaved output of the first converter and the second converter;
generating a first drive signal to control switching of the first converter;
receiving a first cycle signal from the first converter;
receiving a second cycle signal from the second converter, wherein the first and the second cycle signals have a power phase time corresponding to a power phase of a respective converter and a ringing phase time corresponding to a ringing phase of the respective converter;
determining a master ringing phase time of the first cycle signal;
applying the master ringing phase time to the second cycle signal to determine a slave ringing phase time; and
generating a second drive signal to control switching of the second converter in accordance with the slave ringing phase time.

16. The method of claim 15, wherein the master ringing phase time comprises a master time duration corresponding to a number of valleys of the ringing phase of the first cycle signal, the method further comprising:
applying the master time duration to the ringing phase of the second cycle signal; and
determining the slave ringing phase time as ending at a valley of the ringing phase of the second cycle signal that is closest to an end of the master time duration.

17. The method of claim 16, wherein the master time duration begins at a first local minimum of the first cycle signal and ends after the number of valleys, the valleys being local minima of the ringing phase of the first cycle signal and wherein determining the closest valley comprises selecting a local minimum of the second cycle that is closest to the master time duration.

18. An interleaved boost converter controller, comprising:
an output to provide a first drive signal to control switching of a first converter, the first converter to receive an input power and generate a first converted output power;
an output to provide a second drive signal to control switching of a second converter, the second converter to receive the input power and generate a second interleaved output power;
an input to receive a first cycle signal from the first converter;
an input to receive a second cycle signal from the second converter, wherein the first and the second cycle signals have a power phase time corresponding to a power phase of a respective converter and a ringing phase time corresponding to a ringing phase of the respective converter; and
control means within the interleaved boost converter controller to determine a master ringing phase time of the first cycle signal and to apply the master ringing phase time to the second cycle signal to determine a slave ringing phase time, the interleaved boost converter controller generating the second drive signal in accordance with the slave ringing phase time.

19. The interleaved boost converter controller of claim 18, wherein the master ringing phase time comprises a master time duration corresponding to a number of valleys of the ringing phase of the first cycle signal, wherein the control means applies the master time duration to the ringing phase of the second cycle signal and determines the slave ringing phase time as ending at a valley of the ringing phase of the second cycle signal that is closest to an end of the master time duration.

20. The interleaved boost converter controller of claim 18, wherein the slave ringing phase time is determined by selecting a zero crossing of the second cycle signal before the end of the master time duration applied to the ringing phase of the second cycle signal, determining a distance between the selected zero crossing and the end of the master time duration applied to the ringing phase of the second cycle signal, if the distance is less than three quarters of an oscillation time of the second cycle signal, then determining that the next valley is the closest, and if the distance is more than three quarters of the oscillation time, then determining that a subsequent valley is the closest.

* * * * *